W. H. H. KESLER.
Window-Frame Machine.
No. 218,751.   Patented Aug. 19, 1879.
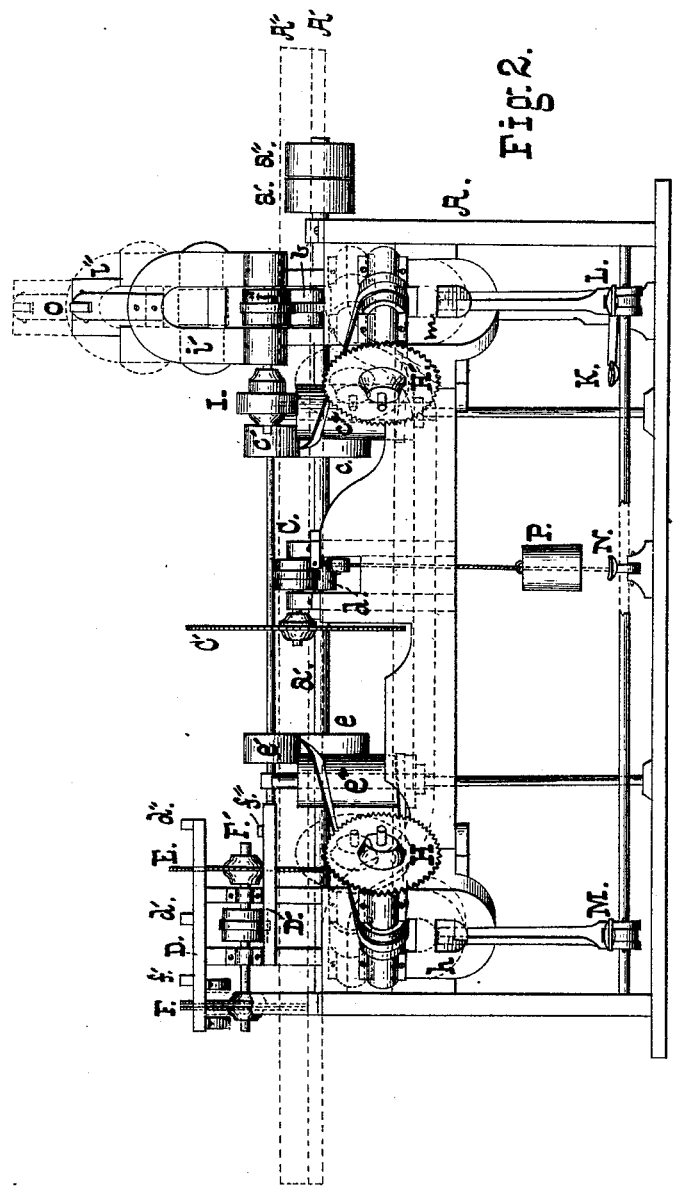

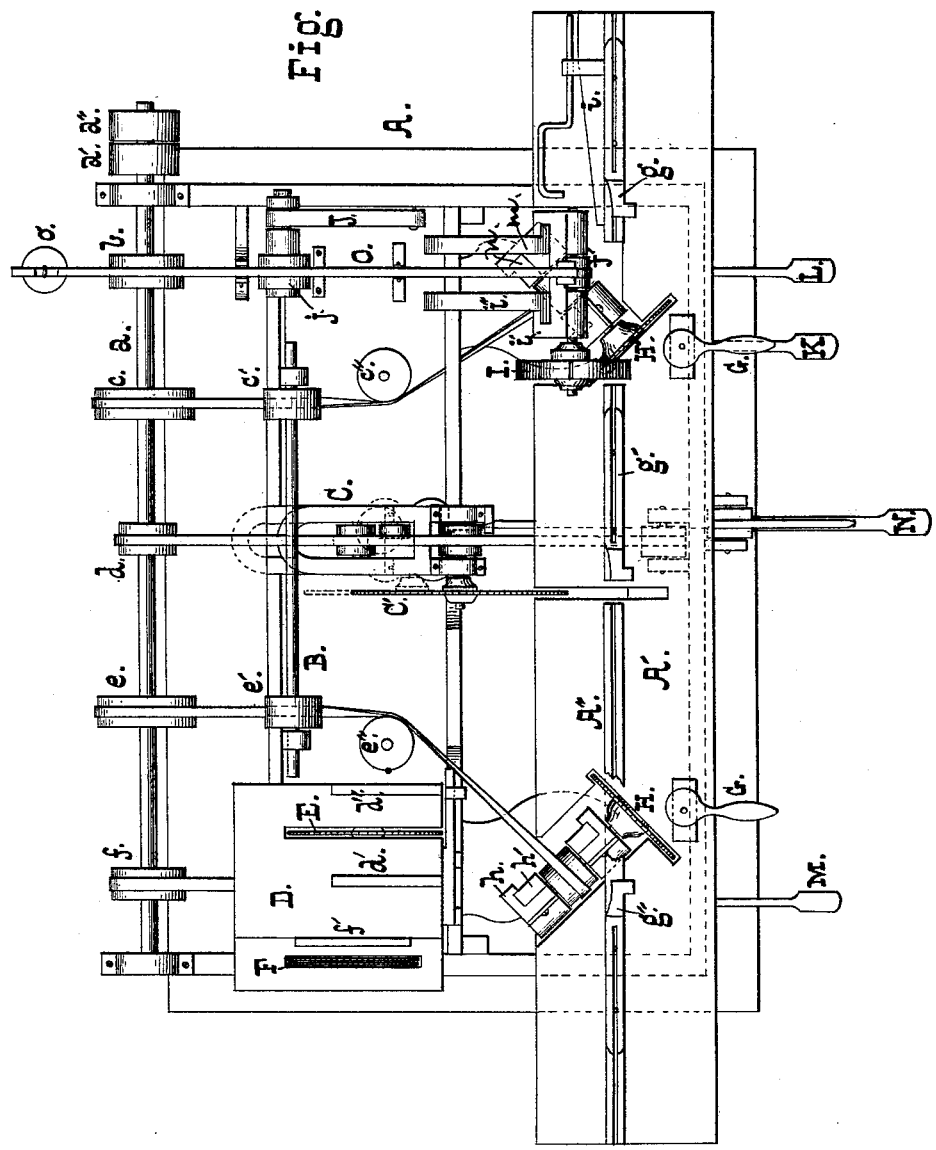

W. H. H. KESLER.
Window-Frame Machine.
No. 218,751. Patented Aug. 19, 1879.
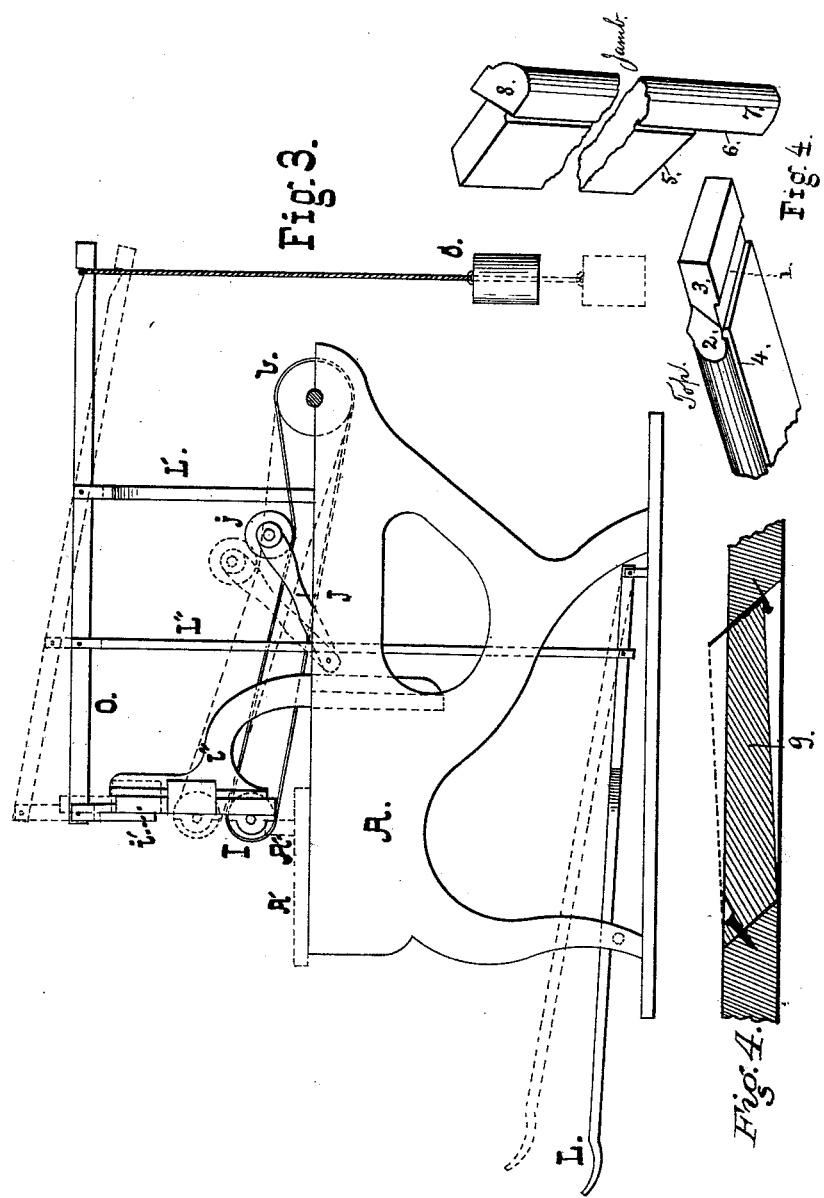
Witnesses:
W. A. Bertram
D. L. H. Barclay
Inventor.
Wm. H. H. Kesler
by S. D. Williams, Atty

UNITED STATES PATENT OFFICE.

WILLIAM H. H. KESLER, OF BALTIMORE, MARYLAND.

IMPROVEMENT IN WINDOW-FRAME MACHINES.

Specification forming part of Letters Patent No. 218,751, dated August 19, 1879; application filed May 20, 1879.

*To all whom it may concern:*

Be it known that I, WILLIAM H. H. KESLER, of Baltimore city, State of Maryland, have invented certain new and useful Improvements in Window-Frame Machines; and I hereby declare the same to be fully, clearly, and exactly described as follows, reference being had to the accompanying drawings, in which—

Figure 1 is a plan view of the machine; Fig. 2, a front elevation of the same, parts being broken away to more fully illustrate certain details; Fig. 3, an end elevation of the device, and Fig. 4 views of parts of the window-frame, showing the lines of cuts.

My invention has for its object to furnish a machine adapted to perform all the operations required in manufacturing any of the varieties of window-frames from stuff as it is delivered from the mill, which operations have heretofore involved the use of many separate machines and the loss of much time in carrying the parts from one machine to the next. All of these operations are performed by the single machine about to be described, which is, moreover, so designed as to involve but the minimum motion of the stuff in passing from one operation to the next.

The machine will first be described, and then, seriatim, the steps performed in making either a plain, box, or frame-house frame.

In the accompanying drawings, A is the main frame of the device, at the rear side of which is mounted the driving-shaft $a$, carrying a fast and loose pulley, $a'$ $a''$, and also other pulleys, $b$ $c$ $d$ $e f$, for driving the various working parts of the device. A' is the bed-plate, upon which is mounted the vertical board A'', against the faces of which the major part of the work is performed, and which carries adjustable stops $i$ $g$ $g'$ $g''$, whose functions will be understood when the operation of the device is described.

At the right-hand end of the machine are vertical guides $i''$, upon which slides the frame $i'$, in which is mounted a shaft carrying the routing-disk I and a pulley, $j'$, driven by a belt from the pulley $b$. J is a lever (see Fig. 3) pivoted to the main frame, and carrying a pulley, $j$, for maintaining tension of the belt.

To the frame $i'$ is attached a lever, O, pivoted upon a rod, L', a weight, $o$, being attached to the opposite end of the lever. A rod, L'', connects the lever O with a treadle, L, at the front of the machine.

Upon depressing the treadle the frame $i'$ and routing-disk I descend, the latter cutting through a slot in the vertical plate A'', as shown in Fig. 1. The next pulley, $c$, upon the main shaft drives the circular saw H', (see Fig. 2,) that is mounted in a frame, $m$, which slides on vertical guides $n$, attached to the main frame, and carries a pulley for the driving-belt.

The saw cuts through a slot in the bed-plate, and is raised by a treadle, K, (lever of first class,) the weight of the frame causing it to descend when the treadle is released. Horizontal and vertical guide-pulleys $c'$ $c''$ are provided for the belt from the driving-pulley $c$.

The saw H, frame $h$, guides $h'$, and pulleys $e''$ $e'$ $e$ are the counterpart in every respect of those just described, except that the saw is inclined the opposite way, for a reason which will be apparent.

The pulley $d$ drives the circular saw C', which is mounted in a frame, C, that reciprocates on horizontal guides, being actuated by the treadle N, a weight, P, serving to retract the frame.

At the left of the main frame is mounted a table, D, provided with suitable adjustable stops $f'$ $d'$ $d''$ for gaging the work of the routing and circular saws F E, which are mounted on a shaft, F', in bearings below the table D. A pulley upon this shaft is driven by a belt from the pulley $f$.

Below the table D is a second table, D', having a stop, $f'''$. G G are suitable cams for clamping the frame against the vertical plate A''.

Such is, in general terms, a description of the machine, which, taken in connection with the accompanying drawings, will enable one skilled in the art to make it. Its operation will now be set forth.

For a plain window-frame, the top is routed at 1 near one end for the insertion of the jamb by means of the disk I. It is then moved longitudinally until the stop $g''$ enters the groove just formed, this stop being so adjusted that the next groove is the proper distance from the first, when the work is clamped again by the cam G and the second groove is routed. The miter 2 is next cut in the same end by the saw H', and in the opposite end by the saw H, the top being slid lengthwise the proper distance. The miters are then cut out by a cut, 3, the plane of which is at right angles to the planes of the miter-cuts upon the saw E, the stops $d'$ $d''$ being properly adjusted and used. Finally the top is routed at 4 longitudinally by means of the saws F for the stop-bead of the frame.

Just here it may be well to set forth an advantage attending a certain part of the work described. The miter is at an angle of forty-five degrees, and the cut of the saw E to take out the block is made with that part of the saw opposite the forty-fifth degree of the upper front quadrant. As a consequence the two cuts almost exactly meet, as nearly so as a circular-saw cut can be made to meet a straight or other circular-saw cut, and the frame is not marred by overlapping cuts, as usual.

The first operation upon the jamb is to cut it off square at one end, which is done on the front of the plate A'' by means of the saw C', and next to bevel the other end at 5 for the sub-sill, this second operation being done on the inside of the plate A'', the stop $i$ giving the proper bevel and the same saw being used. The bottom is next square cut at 6 on the saw E, using the lower table and stop $f'''$, leaving the usual side projections, 7, and the top end is finally mitered at 8 for the junction with the frame-top. The sub-sill is simply cut off to fit.

For a box-frame the operations are the same as far as above described. This class of frames however, has a pocket for the insertion of the weights. The jambs being routed on the saws F for the parting beads, the pockets are made as follows: A longitudinal cut is made about twelve or eighteen inches long on the saw E, and the piece 9 is cut out on the saw H with the same bevel at each end. The object being now to use the same piece as the cover, it is accomplished as follows: The piece is moved lengthwise to take up for the saw-cuts, canted longitudinally until it jams in the slot, when it is supported on two nails at one end and secured by a screw at the other. The projecting face is then dressed off flush with the frame. The detached drawing on Sheet 3 illustrates this fully.

For a frame-house frame the operations are the same, except that the jambs are routed and mitered, and heads are cut square.

What I claim is—

1. In a window-frame machine, a suitable device for holding the work, in combination with a routing-disk and circular saw so arranged with reference to the work-holder that the operations of routing and forming the miter-cut are completed without moving the work, substantially as set forth.

2. In a window-frame machine, a routing-disk and miter-saw adapted to reciprocate, as described, in combination with the bed-plate, work-plate A'', and suitable clamping mechanism, as set forth.

3. In combination with the plates A' A'', the saws H H', inclined as described, and routing-disk I, substantially as set forth.

4. In combination with the frame, shaft $a$, and driving-pulleys, the reciprocating saws H H' C' and routing-disk I, as described.

5. In combination with the plates A' A'', miter-saws, and routing-disk, the stops $g$ $g'$ $g''$, as set forth.

W. H. H. KESLER.

Witnesses:
J. C. GITTINGER,
C. E. SIMMONS.